(No Model.)
W. NIVENS.
COTTON CHOPPING MACHINE.
No. 496,229. Patented Apr. 25, 1893.
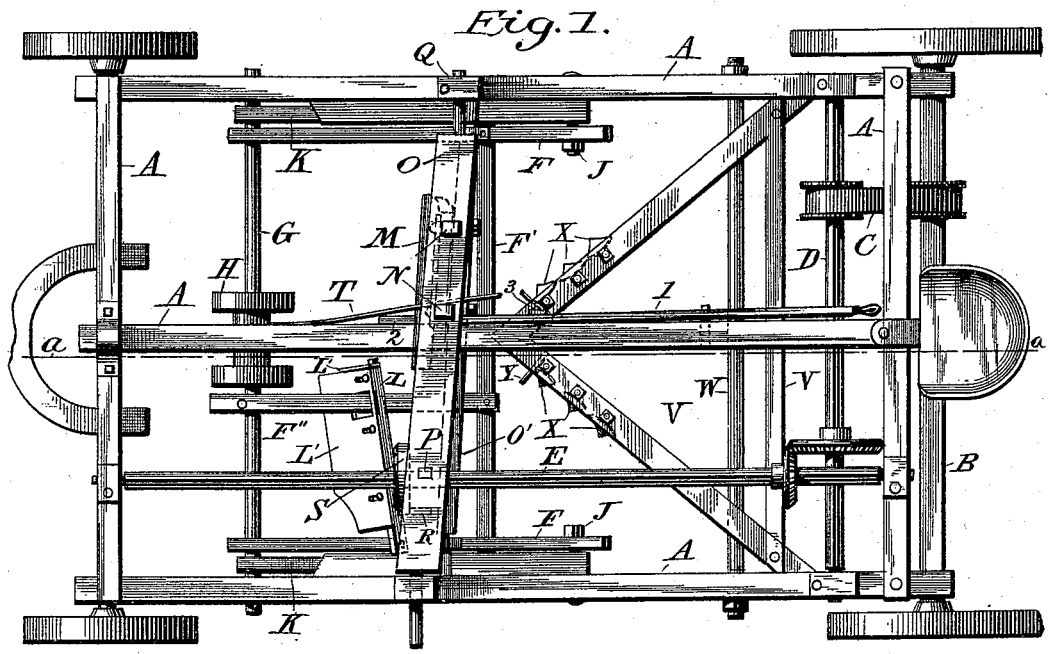
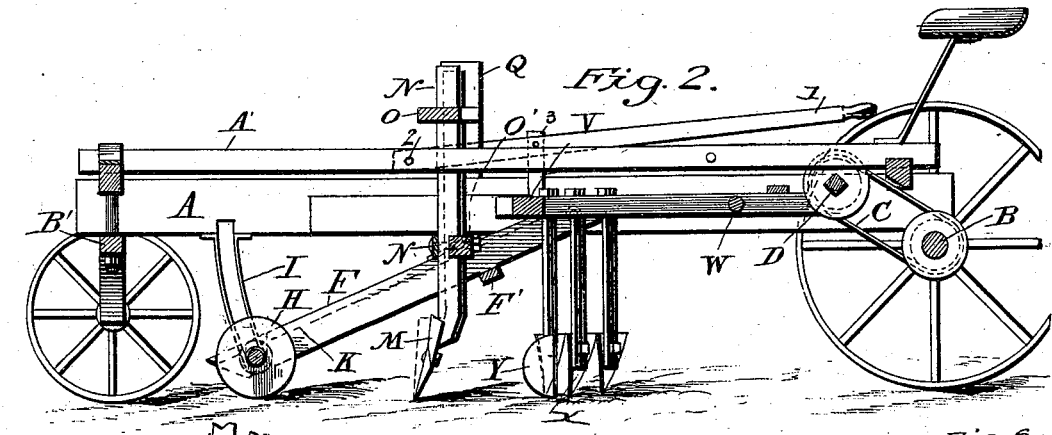
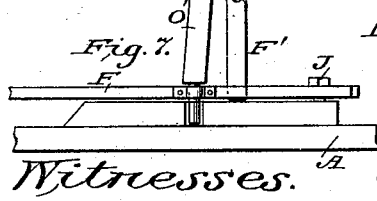
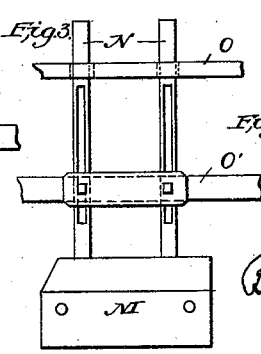
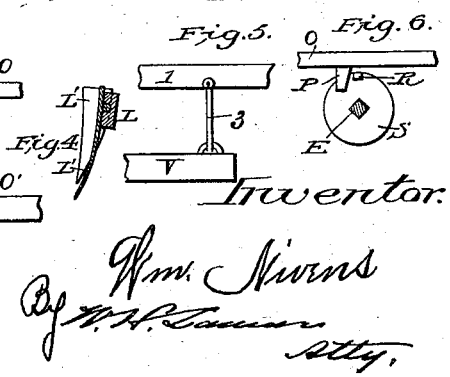
Witnesses.
P. J. Nivens
W. F. Ratliff
Inventor.
Wm. Nivens
By W. H. Tanner
Atty.

UNITED STATES PATENT OFFICE.

WILLIAM NIVENS, OF DEEP CREEK, NORTH CAROLINA.

COTTON-CHOPPING MACHINE.

SPECIFICATION forming part of Letters Patent No. 496,229, dated April 25, 1893.

Application filed March 9, 1892. Serial No. 424,358. (No model.)

*To all whom it may concern:*

Be it known that I, WILLIAM NIVENS, a citizen of the United States, residing at Deep Creek, in the county of Anson and State of North Carolina, have invented certain new and useful Improvements in Cotton-Chopping Machines; and I do hereby declare the following to be a full, clear, and exact description of the invention, such as will enable others skilled in the art to which it appertains to make and use the same.

The invention is fully illustrated in the accompanying drawings, in which,—

Figure 1 is a plan of the machine, and Fig. 2 a section on the line $a-a$, Fig. 1. Figs. 3, 4, 5, 6, 7, are detail views in plan and elevation of the parts indicated by the same letters and numerals upon the larger figures.

In the drawings, A, A is a rectangular frame supported at both front and rear upon suitable wheels. One at least of the wheels is fixed to the rear axle B in order that the latter shall rotate as the machine advances. This axle, by means of a belt C, drives a rotary shaft D mounted upon the frame in front of it, and this shaft by suitable gears transmits its motion to a longitudinal shaft E, for purposes that will appear. A secondary frame is pivoted to the frame A at J, J and is made up of side bars F, a cross bar F', and a shaft G connecting the lower ends of the side bars, which extend obliquely downward and forward from the pivotal axis. The shaft G bears gage rollers H and as the secondary frame swings upon its axis rises and falls in guides I depending from the main frame. Its rising is resisted by springs K whose free ends rest upon the shaft and whose rear ends are rigidly supported from the main frame. Upon one of the bars F and a parallel bar F'' is supported an oblique shovel or cutting scraper L formed by adjustably securing to a suitable foot a thin steel plate L' whose approximately horizontal cutting edge extends obliquely rearward from a point near the row line. At the inner end of the plate is a vertical knife L'' that runs along the row line and cuts the earth and weeds so that the plants in the row may not be disturbed. The edge of the scraper normally cuts a thin layer from the surface of the ground and, owing to its obliquity, delivers a large part of it at its outer end in the middle of the space between the rows. Upon the opposite side of the machine and a little farther to the rear is a similar scraper M fixed to vertical bars N which slide in ways in a cross bar O and are secured to another cross bar O', upon the swinging frame, by means permitting their vertical adjustment. Both bars O, O' slide longitudinally in their supports so that they with the vertical bars and attached scrapers may be thrown bodily back and forth in a direction transverse to the line of the machine's advance, thereby carrying the scraper alternately into and out of the line of the row operated upon. A spring T secured to the frame A and resting against one of the bars N, normally holds the scraper in position to cut the plants in the row, but at intervals the action of the spring is overcome and the scraper thrown to one side of the row by the action of a pin R borne by a wheel S upon the shaft E, before mentioned. In each revolution of the shaft this pin strikes a pin P, depending from the bar O, and forces the whole sliding apparatus over toward the opposite side of the machine. The continued rotation of the wheel causes the pin thereon to disengage the pin F by slipping from its lower end, and instantly after such disengagement all the sliding parts are returned to their normal positions by the elastic force of the spring T.

To leave the earth in proper condition after the operation of these devices, I provide a series of small shovels X which are mounted upon a triangular frame V and arranged to operate upon the earth upon each side of the row,—which is protected from the earth moved by the shovels by small shields Y. These shovels act like a harrow or cultivator and spread the ridge that was formed between the rows and also thoroughly loosen the roots of the weeds from the soil that supports them.

For vertical adjustment of the shovels, the frame V is pivotally supported upon a transverse rod W secured in the frame A and there is provided a handle bar 1, pivoted at 2 and connected to the frame by a link 3, in such manner that the front end of the frame may be raised at will.

What I claim is—

1. The combination with a suitable frame and approximately horizontal cutting scrapers arranged thereon to cut loose the earth and weeds along each side of the row line, of devices arranged to throw one of said scrapers into and out of the row line at regular intervals.

2. The combination with a suitable frame, of an approximately horizontal scraper arranged to cut a little below the surface of the soil at one side of the row line, a second scraper mounted to slide laterally and to cut, like the first, but in and upon the opposite side of said line, and mechanism operated by the advance of the machine to throw the sliding scraper out of said line at regular intervals.

3. The combination with the wheel-supported frame bearing shafts driven from the axle, of the second frame pivoted at one end to the first and having its other end supported by rollers and swinging in guides upon the first, cutting scrapers adjustably supported by the second frame to rise and fall therewith, and connections whereby the continuous rotation of said shafts throws one of said scrapers laterally out of its normal path at intervals.

4. The combination with a suitable main frame bearing a shaft rotated from the axle, an inclined frame depending from a pivotal axis upon the main frame, a cutting scraper secured upon the inclined frame at one side of the row line, a second cutting scraper vertically supported by the inclined frame and carried by bars sliding transversely in the main frame independently of the inclined frame, and means whereby continuous rotation of said shaft causes periodic oscillation of said bars.

5. The combination with the main frame and the forwardly depressed oblique frame pivoted therein and provided with the gage rollers at its free end, of the oblique adjustable cutting scraper at one side of the row line, the similar, oppositely inclined scraper supported by the transversely sliding bars and extending across the row line to the opposite side thereof, a spring pressing said bars to one limit of their path, the pin projecting from one of said bars, and the shaft driven from the axle and bearing the wheel with a pin projecting in position to strike the pin first named and throw the bars toward the opposite limit of their path, as set forth.

In testimony whereof I affix my signature in presence of two witnesses.

WILLIAM NIVENS.

Witnesses:
J. T. RATLIFF,
P. J. NIVENS.